Nov. 1, 1955        F. BUDRECK        2,722,159
ANTI-GLARE REAR VISION MIRROR
Filed June 4, 1952        2 Sheets-Sheet 1
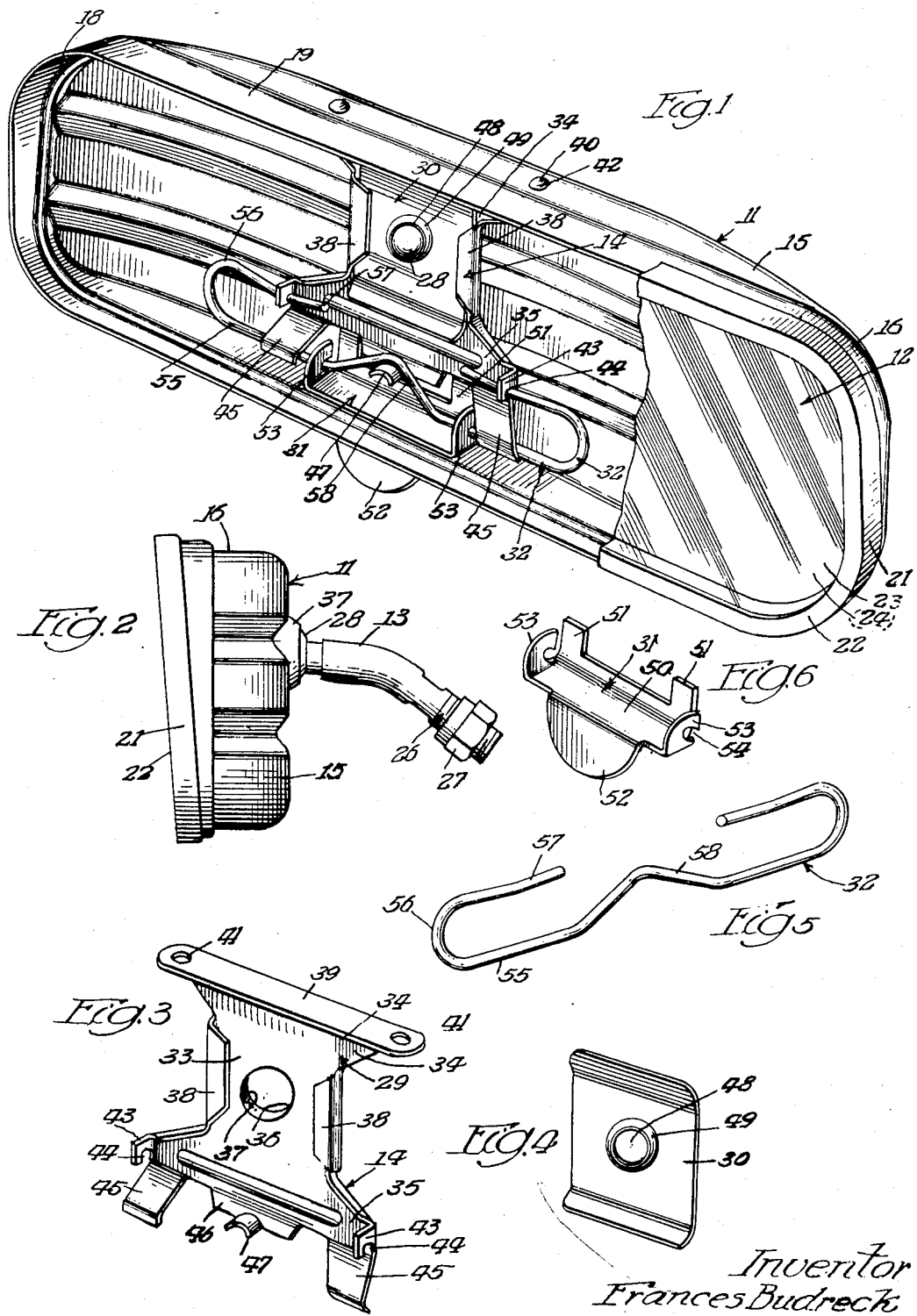
Inventor
Frances Budreck
By: Fred Gerlach
Atty

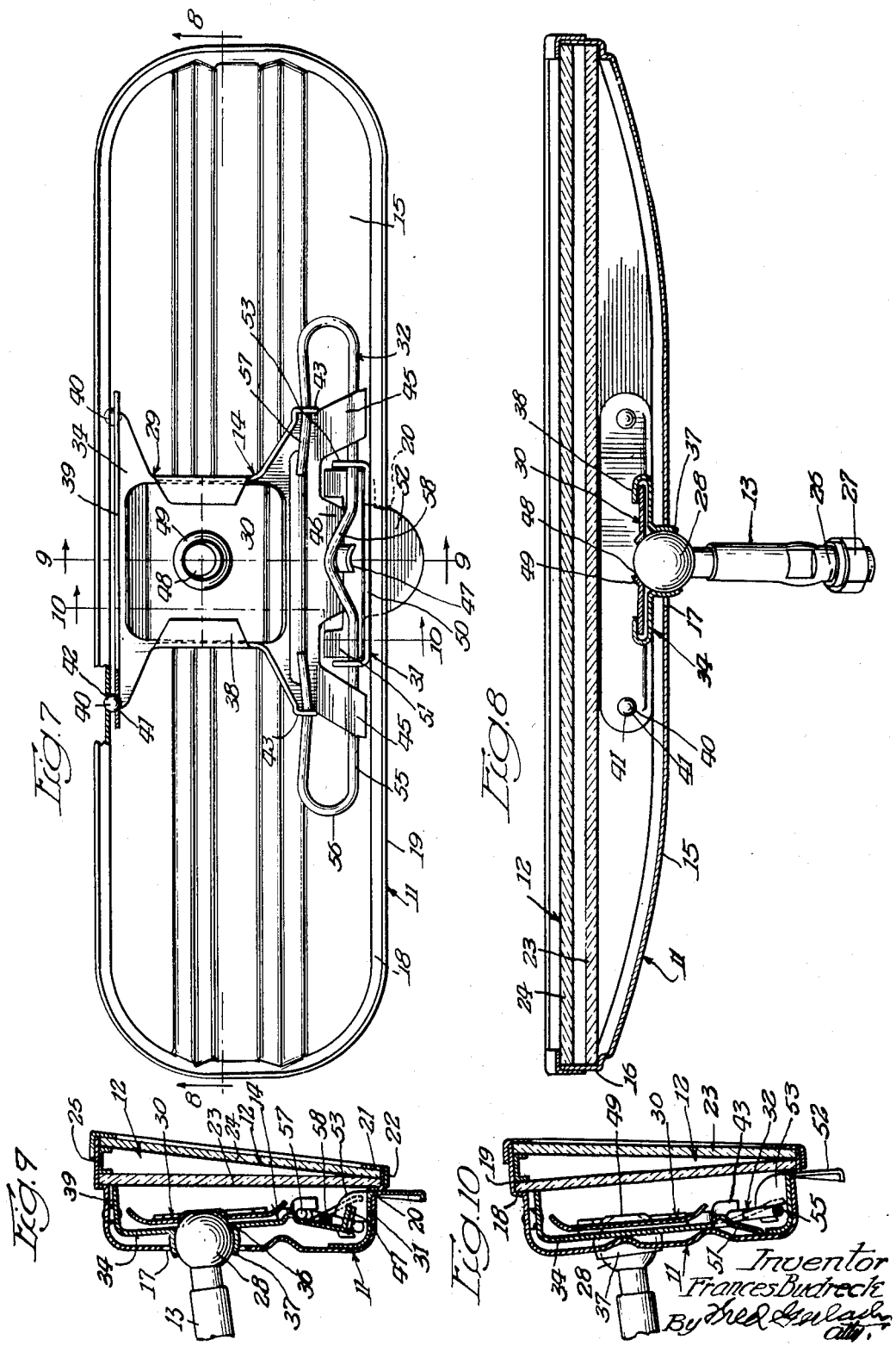

United States Patent Office 2,722,159
Patented Nov. 1, 1955

2,722,159

ANTI-GLARE REAR VISION MIRROR

Frances Budreck, Chicago, Ill., assignor to Monarch Tool & Machinery Co., Chicago, Ill., a corporation of Illinois Application June 4, 1952, Serial No. 291,745

6 Claims. (Cl. 88—77)

The present invention relates generally to antiglare rear vision mirrors. More particularly the invention relates to that type of rear vision mirror which is adapted to be mounted adjacent the upper portion of the windshield of an automobile or other vehicle, enables the user, by selective manipulation or adjustment thereof, to have complete or brilliant reflection under daylight driving conditions or non-glare reflection from following illuminated headlights during night time driving and as its principal parts or components comprises: (1) a shallow horizontally elongated cup-shaped shell which is in the form of a sheet metal stamping and consists of a rearwardly dished rear wall with a hole in its upper central portion and a continuous forwardly extending side wall; (2) a mirror assembly which is shaped conformably to, and is surrounded by, the continuous forwardly extending side wall of the shell, consists of a flat conventional mirror and a flat plain glass panel in front of the mirror, has the bottom marginal portions of the mirror and panel in abutting relation, and embodies a horizontally extending spacing member between the upper marginal portions of the mirror and panel in order to maintain the panel at a small acute angle to the mirror; (3) a mounting arm which is disposed for the most part behind the shell, extends lengthwise of the automobile, embodies at its rear ends means whereby it may be fixedly connected to the automobile at a point adjacent the upper portion of the windshield, and has the front end thereof arranged so that it projects through the hole in the central upper portion of the shell rear wall into the space between the conventional mirror and the shell rear wall; and (4) a mounting structure which is disposed in said space, serves to support the shell with respect to the mounting arm so that it is capable of being tilted rearwards with respect to the mounting arm into a position wherein the conventional mirror is in the line of vision of the user and forwards into a position wherein the plain glass panel is in the user's line of vision, and embodies a dead center spring arrangement which operates when the shell is partially tilted into either of its two tilted positions to complete tilting with a snap action and also operates yieldingly to hold the shell in either of its two fully tilted positions.

One object of the invention is to provide an antiglare rear vision mirror of this type which is an improvement upon and has certain inherent advantages over, previously designed mirrors and is characterized by high efficiency, simplicity of design and low cost of manufacture.

Another object of the invention is to provide an antiglare rear vision mirror of the aforementioned type in which the mounting structure for tiltably supporting the shell with respect to the mounting arm is essentially of simple design and construction and embodies as a part thereof a substantially vertical I-shaped pivot plate which is connected at its intermediate or central part to the shell enclosed front end of the mounting arm, and has between its top part and the central portion of the top part of the continuous forwardly extending side wall of the shell a pivotal connection whereby the shell is permitted to be tilted rearwards and forwards relatively to the pivot plate and mounting arm.

Another object of the invention is to provide a rear vision mirror of the character last mentioned in which the mounting structure for tiltably supporting the shell with respect to the mounting arm has a novel form of universal joint between the central portion of the pivot plate and the front end of the mounting arm in order that the shell together with the mirror assembly may be angularly adjusted in order properly to position the mirror assembly for view by the user, i. e., the driver of the automobile to which the mirror as a whole is applied.

Another object of the invention is to provide an antiglare rear vision mirror of the last mentioned character in which the dead center spring arrangement of the mounting structure is in the form of a horizontally elongated wire spring which is disposed between the central portion of the bottom part of the continuous forwardly extending side wall of the shell and the bottom part of the substantially vertical pivot plate of the mounting structure.

A further object of the invention is to provide a rear vision mirror of the type and character under consideration in which the horizontally elongated wire spring and the bottom part of the pivot plate of the mounting structure have coacting parts which serve to hold the spring against longitudinal displacement with respect to the pivot plate and form a stop for limiting rearward tilting of the shell relatively to the pivot plate and mounting arm.

A still further object of the invention is to provide an anti-glare rear vision mirror which is generally of new and improved construction, embodies a novel arrangement of parts and is so constructed or designed that the various components or parts thereof may be assembled with facility.

Other objects of the invention and the various advantages and characteristics of the present anti-glare rear vision mirror will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a front top perspective view of an antiglare rear vision mirror embodying the invention, certain parts of the mirror being broken away or shown fragmentarily for illustrative purposes;

Figure 2 is a side elevation of the mirror;

Figure 3 is a front top perspective view of the pivot plate of the mounting structure;

Figure 4 is a front top perspective view of the spring metal plate which is fixedly connected to the pivot plate of the mounting structure and forms part of the universal joint between the pivot plate and the front end of the mounting arm;

Figure 5 is a front top perspective view of the horizontally elongated wire spring which constitutes the dead center spring arrangement of the mounting structure;

Figure 6 is a front top perspective view of the spring retaining bracket;

Figure 7 is a front elevation showing the mirror without the mirror assembly and illustrating in detail the construction, design and arrangement of the various parts constituting the mounting structure whereby the cup-shaped shell is supported for rearward and forward tilting movement relatively to the mounting arm;

Figure 8 is a horizontal section taken on the line 8—8 of Figure 7;

Figure 9 is a vertical transverse section taken on the line 9—9 of Figure 7 and showing the shell tilted rearwards in order to bring the conventional mirror of the mirror assembly into the line of vision of the user of the mirror; and Figure 10 is a vertical transverse section like Figure 9 except that it shows the shell tilted forwards in order to bring the plain glass panel of the mirror assembly into play.

The rear vision mirror which is shown in the drawings constitutes the preferred form or embodiment of the invention. It is designed for use on a vehicle such as an automobile and serves in connection with selective manipulation or adjustment to afford the driver of the vehicle complete or full rearward vision during daylight driving or low power or non-glare rearward vision during night time driving. It is contemplated that the mirror as a whole will be positioned adjacent the upper portion of the windshield of the automobile to which it is applied. As its main or principal components the mirror comprises a shell 11, a mirror assembly 12, a mounting arm 13 and a mounting structure 14. These parts when in assembled relation constitute a unitary structure.

The shell 11 of the mirror is horizontally elongated and cup-shaped. It is in the form of a one-piece stamping of light gauge sheet metal and consists of a rear wall 15 and a continuous side wall 16. The rear wall is rearwardly dished to a comparatively small extent in order that it is slightly concavo-convex. It defines with the continuous side wall 16 a comparatively shallow open front compartment for the mirror assembly 12 and has in its upper central portion a circular hole 17. Except for such hole the rear wall 15 is imperforate and the continuous side wall 16 of the shell 11 is connected to, and projects forwards from, the outer marginal portion of the rear wall 15. It is substantially imperforate and embodies on the front marginal portion thereof a continuous outwardly extending flange 18 and a continuous forwardly extending flange 19. The central portion of the bottom part of the continuous side wall 16 of the shell 11 is provided directly rearwards of the central portion of the bottom part of the continuous outwardly extending flange 18 with a longitudinal slot 20, the purpose of which will appear hereafter. The continuous outwardly extending flange 18 is formed integrally with, and extends at right angles to, the outer marginal portion of the side wall 16, and the continuous forwardly extending flange 19 is connected to, and formed integrally with, the outer marginal portion of the flange 18. The top part of the continuous forwardly extending flange 19 is materially wider than the bottom part of such flange, as best shown in Figures 9 and 10, and the side parts of the flange 19 are downwardly tapered, as shown in Figure 2. The flanges 18 and 19 constitute, in effect, parts of the continuous side wall 16 of the shell 11. Extending around and in frictional engagement with the front marginal portion of the continuous forwardly extending flange 19 is a correspondingly shaped frame 21. The latter is in the form of a sheet metal stamping and embodies at its front margin a continuous inwardly extending right angle flange 22. The purpose of the flange equipped frame 21 is to retain in place the mirror assembly 12.

The mirror assembly 12 is fixedly mounted within the shell 11 and consists of a flat conventional mirror 23 and a flat plain glass panel 24 in front of the mirror. The conventional mirror 23 is shaped conformably to, and fits within the continuous forwardly extending flange 19 of the shell and is arranged so that its marginal portion is in abutment with the continuous outwardly extending flange 18. It may be of any desired construction but preferably consists of a glass panel having the rear surface thereof mirrored. The mirrored rear surface of the conventional mirror constitutes a full value or power reflecting surface which when the shell and mirror assembly are tilted rearwards relatively to the mounting arm 13, as hereinafter described, is brought into the line of vision of the user of the mirror as a whole and affords complete or brilliant rearward vision under daylight driving conditions. The flat plain glass panel 24 is shaped conformably to the conventional mirror 23 and is disposed within, and surrounded by, the front or free marginal portion of the continuous forwardly extending flange 19. The bottom marginal portion of the plain glass panel 24 is disposed in abutting relation with the lower marginal portion of the conventional mirror 23 and the upper marginal portion of the panel is spaced from the upper marginal portion of the conventional mirror by a channel shaped spacer member 25. The latter is in the form of a sheet metal stamping and, as shown in Figures 9 and 10, is arranged so that the side flanges thereof extend upwards. It is suitably secured in place and serves to maintain the plain glass panel 24 at a small acute angle with respect to the conventional mirror 23. The inwardly extending flange 22 of the frame 21 abuts against the marginal portion of the plain glass panel 24 and hence serves to hold the assembly 12 in fixed relation with the cup-shaped shell 11. The plain glass panel 24 constitutes a low power or value reflecting surface which is brought into play when the shell and mirror assembly are tilted forwards relatively to the mounting arm 13 and affords the user of the mirror proper non-glare rearward vision against following illuminated headlights during night time driving of the automobile to which the mirror as a whole is applied.

The mounting arm 13 is located or disposed directly behind the shell 11, is adapted to extend lengthwise of the automobile and is formed of steel or any other suitable metal. It embodies at its rear end a screw thread 26 and a nut 27 whereby it may be fixedly connected to the automobile at a point adjacent the upper portion of the windshield. The front end of the mounting arm 13 extends through the circular hole 17 in the upper central portion of the shell rear wall 15 and is shaped to form a ball-shaped member 28.

The mounting structure 14 is disposed in the shell 11 between the conventional mirror 23 of the assembly and the rear wall 15 of the shell and serves to support the shell with respect to the mounting arm 13 so that it is capable of being tilted rearwards into a position wherein the conventional mirror 23 is in the line of vision of the user and forwards into a position wherein the plain glass 24 is in the user's line of vision. As its parts or components the mounting structure 14 comprises a pivot plate 29, a spring metal plate 30, a spring retaining bracket 31 and a horizontally elongated wire spring 32. The pivot plate 29 of the mounting structure 14 is in the form of a one-piece sheet metal stamping and is disposed in a substantially upstanding position directly in front of the central portion of the rearwardly dished rear wall 15 of the shell 11. It is generally I-shaped so far as configuration is concerned and consists of a narrow intermediate part 33, a horizontally elongated top part 34 and a horizontally elongated bottom part 35. The intermediate part 33 of the pivot plate is substantially flat and has in the central portion thereof a circular hole 36. The hole defining portion of the central portion of the intermediate part 33 is bent rearwards and inwards to form a concavo-convex annular flange 37 in which the rear portion of the ball-shaped member 28 is movably seated, as shown in Figure 8. The flange 37 is aligned with, but is smaller in diameter than, the circular hole 17 in the upper central portion of the shell rear wall 15, and is adapted when the shell is tilted rearwards with respect to the mounting arm 13 to extend partially through the hole 18, as shown in Figure 10. The side margins of the intermediate part 33 of the pivot plate are bent forwards and inwards in order to form a pair of opposed hook-like tongues 38. The horizontally elongated top part 34 of the pivot plate has the upper margin thereof bent forwards at right angles to form a flat substantially horizontal flange 39. It directly underlies the central portion of the top part of the continuous forwardly extending side wall 16 of the shell. Two laterally spaced balls 40 are disposed between the ends of the flange 39 and the superjacent portions of the top part of the shell side wall 16 and form a pivotal connection whereby the shell 11 together with the mirror assembly 12 is permitted to be tilted rearwards and forwards relatively to the pivot plate 33 and the mounting arm 13. The lower portions of the balls fit movably in circular holes 41 in the ends of the flange 39 and the upper portions of the balls fit movably in holes 42 in said superjacent portions of the top part of the shell side wall 16. The horizontally elongated bottom part 35 of the pivot plate 33 has the ends thereof bent forwards at right angles to form a pair of laterally spaced lug-like members 43 and these, as best shown in Figure 3, have downwardly facing notches 44 in their bottom portions. The lower marginal portion of the bottom part 35 of the pivot plate embodies at its ends a pair of downwardly and forwardly inclined legs 45 and has between the legs a depending tongue 46. The legs 45 have the lower ends thereof disposed directly over the central portion of the bottom side wall 16 and serve when the various parts of the mounting structure 14 are in assembled relation to prevent such vertical displacement of the shell with respect to the pivot plate as to dislodge the balls 40 from the holes 41 and 42. The depending tongue 46 has its ends spaced inwards from the legs 45 and embodies on its lower central portion and integral forwardly extending saddle shaped part 47, the purpose of which will be described hereafter. The spring metal plate 30 of the mounting structure 14 is located directly forwards of the intermediate part 33 of the pivot plate 29 and has the side margins thereof disposed behind, and in interlocked relation with, the hook-like tongues 38 on the side margins of said intermediate part of the pivot plate. The central portion of the spring metal plate 30 is provided with a circular hole 48 which is the same in size as, and registers with, the hole 36 in the intermediate part 33 of the pivot plate 29. The hole defining portion of the spring metal plate 30 is bent forwards and inwards to form a concavo-convex annular flange 49 in which the front portion of the ball shaped member 28 is movably seated. The ball shaped member 28 on the front end of the mounting arm 13, the annular flange 30 on the central portion of the intermediate part 33 of the pivot plate 29, and the annular flange 49 on the central portion of the spring metal plate 30 together form a universal joint whereby the shell 11 and the mirror assembly 12 may be angularly adjusted sidewise or up and down in order properly to position the mirror assembly for view by the user. In assembling the mounting arm 13 and the mounting structure the arm is first inserted rearwards through the hole 36 in the central portion of the intermediate part 33 of the pivot plate until the rear portion of the ball shaped member 28 is brought into seated relation with the concavo-convex annular flange 37. This operation is carried out before bending into place of the tongues 38. After insertion of the mounting arm through the hole 36 the spring metal plate 30 is positioned in front of the intermediate part 33 of the pivot plate and moved rearwards until the front of the ball shaped member 28 is seated in the concavo-convex annular flange 48. After proper positioning of the spring metal plate the tongues 38 are bent forwards and inwards into lapped relation with the side margins of the plate 30. It is contemplated that the tongues will be bent inwards to such an extent that the side portions of the plate 30 will be bowed rearwards in order to cause the ball shaped member 28 on the front end of the mounting arm to be clamped firmly between the flanges 37 and 49. By reason of this particular arrangement the universal joint is comparatively tight and hence the shell 11 when angularly adjusted by way of the joint will remain firmly in place. The upper and lower end portions of the spring metal plate 30 are bent forwards in order that the ends thereof coact with the ends of the tongues 38 to hold the spring metal plate against vertical displacement with respect to the pivot plate 29.

The spring retaining bracket 31 of the mounting structure 14 is in the form of a one-piece sheet metal stamping and is located directly beneath the pivot plate 29. It serves as a retaining medium or instrumentality for the horizontally elongated wire spring 32 of the mounting structure and comprises a flat horizontally extending body member 50 which rests on the central portion of the bottom part of the shell side wall 16. The ends of the rear side margins of the body member 50 are provided with integral upwardly extending right angle tongues 51 and these fit against the lower central portion of the shell rear wall 15 and are spot welded or otherwise fixedly secured thereto in order to hold the spring retaining bracket 31 in fixed relation with the shell. The central portion of the front side margin of the body member 50 is provided with an integral depending tongue shaped member 52 which projects downwards through the longitudinally extending slot 20 in the central portion of the bottom part of the shell side wall 16 and forms a handle which may be grasped between the thumb and first finger in connection with rearward and forward tilting of the shell relatively to the mounting arm 13. The ends of the body member 51 are bent upwards at right angles to form a pair of laterally spaced lug-like members 53. The latter are disposed outwards of the tongues 51 and have in their rear side portions rearwardly facing notches 54. As best shown in Figures 1 and 7, the notched lug-like members 53 at the ends of the body 50 are disposed inwards of the forward and inwardly inclined legs 45 on the horizontally elongated bottom part 35 of the pivot plate 29. The horizontally extending wire spring 32 of the mounting structure 14 is disposed between the bracket 31 and the bottom part 35 of the pivot plate 29 and constitutes a dead-center spring arrangement which operates when the shell is partially tilted into either of its two tilted positions to complete tilting with a snap action and also operates yieldingly to hold the shell in either of its two fully tilted positions. As shown in Figures 5 and 7, the spring 32 consists of a single length of wire, the end portions of which are bent upwards and then inwards so that the spring as a whole consists of an elongated bottom part 55, upwardly extending substantially semi-circular end parts 56, and inwardly extending spaced apart top parts 57. The central portion of the bottom part 55 of the spring 32 overlies the horizontally extending body member 50 of the spring retaining bracket 31 and is rotatably mounted in the rearwardly facing notches 54 in the laterally spaced upwardly extending lug-like members 53. The central portions of the top parts 57 of the spring fit and are rotatably mounted in the downwardly facing notches 44 in the lug-like members 43 on the ends of the bottom part 35 of the pivot plate 29. The upwardly extending semi-circular end parts 56 of the spring 32 are under such compression that when the spring is in its operative or assembled position they urge the top parts 57 upwards. The spring 32 is so arranged that it is tilted upwards and forwards when the shell is in its rearwardly tilted position (see Fig. 9) and is tilted upwards and rearwards when the shell is in its forwardly tilted position (see Fig. 10). When the shell is positioned midway between its two tilted positions the spring 32 is in a truly dead-center position. As a result of this when the shell is partially tilted rearwards the spring, after passing its dead-center position, automatically swings the shell into its fully rearwardly tilted position with a snap action and when the shell is tilted partially forwards the spring, after passing its dead-center position, automatically swings the shell into its full forwardly tilted position with a snap action. The amount of forward tilting of the shell is determined by the bottom part 35 of the pivot plate 29 striking against the adjacent portion of the rearwardly dished rear wall 15 of the shell. The portion of the bottom part 55 of the spring 32 that is between the notched lug-like members 53 of the spring retaining bracket 31 is bent upwards so as to form an inverted V-shaped part 58 which straddles the forwardly extending saddle shaped member 47 on the depending tongue 46 of the bottom part 35 of the pivot plate 29 and coacts therewith to hold the spring 32 as a whole against longitudinal displacement with respect to the pivot plate 29 and the spring retaining bracket 31 and also to form a stop for limiting rearward tilting of the shell relatively to the pivot plate and mounting arm. In connection with assembly of the mounting structure 14 the central portion of the bottom part 55 of the spring is first inserted into the rearwardly facing notches 54 in the lug-like members 53 at the ends of the body member 51 of the spring retaining bracket. Thereafter the inner ends of the spring top parts 57 are depressed and swung rearwards in order to bring the central portions thereof into alignment with the downwardly facing notches 44 in the lug-like members 43. Upon release of the inner ends of the top parts 57 of the spring the top parts spring upwards and cause the central portions thereof to seat rotatably in the notches 44. In connection with rearward and forward tilting of the shell the central portions of the top parts 57 that are within the notches 44 constitute the fulcrum or articulation point about which the spring as a whole swings or pivots.

When the user of the mirror desires in connection with daytime driving to have full or complete rearward vision the shell 11 is tilted rearwards towards the windshield of the automobile in order to bring the conventional mirror 23 of the mirror assembly 12 into the line of vision of the user of the mirror. Rearward tilting of the shell is effected by grasping the exteriorly disposed handle forming tongue 58 and forcing it rearwards in the direction of the automobile windshield. If, in connection with night time driving, it is desired to have nonglare reflection the shell is tilted forwards with respect to the pivot plate 29 and the mounting arm 30. This is accomplished by pulling the handle forming member 58 forwards and results in the conventional mirror 23 being rendered inoperative and the plain glass panel 24 being brought into the line of vision of the mirror user.

The herein described non-glare rear vision mirror effectively and efficiently fulfills its intended purpose and, due to the particular design and construction of its mounting structure 14, may be assembled with facility and produced at a low or reasonable cost.

The invention is not to be understood as restricted to the details set forth since these may be modified within the scope of the appended claims without departing from the spirit and scope of the invention.

Having thus described the invention what I claim as new and desire to secure by Letters Patent is:

1. A mounting structure for an anti-glare rear vision mirror of the type that embodies a horizontally elongated cup-shaped shell consisting of a rear wall and a continuous forwardly extending side wall and provided with a hole in the upper central portion of its rear wall, a mirror assembly shaped conformably to, and mounted fixedly within, the front portion of the shell side wall and embodying a pair of reflecting surfaces of different reflecting power and disposed at all times at a fixed small acute angle to one another, and a mounting arm disposed for the most part behind the shell, provided at its rear end with attaching means and having its front end extending through said hole into the rear portion of the shell interior, said mounting structure comprising an upstanding pivot plate disposed in the shell between the central portions of the mirror assembly and the shell rear wall, having the central part thereof connected to the front end of the mounting arm, embodying between its top part and one of the walls of the shell a pivotal connection whereby the shell is permitted to tilt rearwards relatively to the pivot plate and mounting arm into a position wherein one of the reflecting surfaces of the mirror assembly is in the line of vision of the user and forwards relatively to the pivot plate and mounting arm into a position wherein the other reflecting surface is in the line of vision of the user, and provided at its bottom part with a pair of forwardly extending laterally spaced lug-like members with downwardly facing notches therein, a bracket disposed in the shell interior beneath the pivot plate, mounted fixedly on the central portion of the bottom part of the shell side wall, and provided with a pair of upwardly extending laterally spaced lug-like members with rearwardly facing notches therein, and a dead center spring arrangement operative after the shell is partially tilted into either position to complete tilting with a snap action, also operative yieldingly to hold the shell in either of its fully tilted positions and consisting of a spring formed of a single length of wire and embodying an elongated horizontally extending bottom part having the central portion thereof mounted pivotally in the notches in the second mentioned lug-like members, upwardly extending substantially semi-circular end parts having the lower ends thereof connected to the ends of the bottom part, and a pair of top parts connected to, and extending inwards from, the upper ends of the end parts and having the central portions thereof mounted pivotally in the notches in the first mentioned lug-like members.

2. A mounting structure for an anti-glare rear vision mirror of the type that embodies a horizontally elongated cup-shaped shell consisting of a rearwardly dished rear wall and a continuous forwardly extending side wall and provided with a hole in the upper central portion of its rear wall, a mirror assembly shaped conformably to, and mounted fixedly within, the front portion of the shell side wall and embodying a pair of reflecting surfaces of different reflecting power and disposed at all times at a fixed small acute angle to one another, and a mounting arm disposed for the most part behind the shell, provided at its rear end with attaching means and having its front end extending through said hole into the rear portion of the shell interior, said mounting structure comprising an upstanding I-shaped pivot plate disposed in the shell between the central portions of the mirror assembly and the shell rear wall, having the central part thereof connected to the front end of the mounting arm by a universal joint, embodying between its top part and the central portion of the top part of the shell side wall a pivotal connection whereby the shell is permitted to tilt rearwards relatively to the pivot plate and mounting arm into a position wherein one of the reflecting surfaces of the mirror assembly is in the line of vision of the user and forwards relatively to said pivot plate and mounting arm into a position wherein the other reflecting surface is in the line of vision of the user, and provided at the ends of its bottom part with a pair of forwardly extending laterally spaced lug-like members with downwardly facing notches therein, a bracket disposed in the shell interior beneath the pivot plate, mounted fixedly on the central portion of the bottom part of the shell side wall, and provided with a pair of upwardly extending laterally spaced lug-like members with rearwardly facing notches therein, and a dead center spring arrangement operative after the shell is partially tilted into either position to complete tilting with a snap action, also operative yieldingly to hold the shell in either of its fully tilted positions and consisting of a spring formed of a single length of wire and embodying an elongated horizontally extending bottom part having the central portion thereof mounted pivotally in the notches in the second mentioned lug-like members, upwardly extending substantially semi-circular end parts having the lower ends thereof connected to the ends of the bottom part, and a pair of top parts connected to, and extending inwards from, the upper ends of the end parts and having the central portions thereof mounted pivotally in the notches in the first mentioned lug-like members.

3. A mounting structure for an anti-glare rear vision mirror of the type that embodies a horizontally elongated cup-shaped shell consisting of a rear wall and a continuous forwardly extending side wall and provided with a hole in the upper central portion of its rear wall, a mirror assembly shaped conformably to, and mounted fixedly within, the front portion of the shell side wall and embodying a pair of reflecting surfaces of different reflecting power and disposed at all times at a fixed small acute angle to one another, and a mounting arm disposed for the most part behind the shell, provided at its rear end with attaching means and having its front end extending through said hole into the rear portion of the shell interior, said mounting structure comprising an upstanding stamped metal pivot plate disposed in the shell between the central portions of the mirror assembly and the shell rear wall, having the central part thereof connected to the front end of the mounting arm, and having the upper portion of the top part bent forwards at substantially right angles to form a substantially horizontal flange, a pair of balls disposed between the ends of the flange and the superjacent portions of the top part of the shell side wall and forming a pivotal connection whereby the shell is permitted to be tilted rearwards relatively to the pivot plate and mounting arm into a position wherein one of the reflecting surfaces of the mirror assembly is in the line of vision of the user and forward relatively to said pivot plate and mounting arm into a position wherein the other reflecting surface is in the line of vision of the user, a bracket mounted fixedly in the shell interior beneath the pivot plate, and a dead center spring arrangement operative after the shell is partially tilted into either position to complete tilting with a snap action, also operative yieldingly to hold the shell in either of its fully tilted positions and consisting of a wire spring extending between, and pivotally connected to, the bracket and the bottom part of the pivot plate.

4. A mounting structure for an anti-glare rear vision mirror of the type that embodies a horizontally elongated cup-shaped shell consisting of a rearwardly dished rear wall and a continuous forwardly extending side wall and provided with a hole in the upper central portion of its rear wall, a mirror assembly shaped conformably to, and mounted fixedly within, the front portion of the shell side wall and embodying a pair of reflecting surfaces of different reflecting power and disposed at all times at a fixed small acuate angle to one another, and a mounting arm disposed for the most part behind the shell, provided at its rear end with attaching means and having its front end extending through said hole into the rear portion at the shell interior, said mounting structure comprising an upstanding stamped metal I-shaped pivot plate disposed in the shell between the central portions of the mirror assembly and the shell rear wall, having the central part thereof connected to the front end of the mounting arm by a universal joint having the upper portion of its top part bent forwards to form a substantially horizontal flange and having the ends of its bottom part shaped and bent forwards to form a pair of lug-like members with downwardly facing notches therein, means between the ends of the flange and the superjacent portions of the top part of the shell side wall forming a pivotal connection whereby the shell is permitted to tilt rearwards relatively to the pivot plate and mounting arm into a position wherein one of the reflecting surfaces of the mirror assembly is in the line of vision of the user and forwards relatively to said pivot plate and mounting arm into a position wherein the other reflecting surface is in the line of vision of the user, and provided at its bottom part with a pair of forwardly extending laterally spaced lug-like members with downwardly facing notches therebetween, a bracket disposed in the shell interior beneath the pivot plate, mounted fixedly on the central portion of the bottom part of the shell side wall, and provided with a pair of upwardly extending laterally spaced lug-like members with rearwardly facing notches therein, and a dead center spring arrangement operative after the shell is partially tilted into either position to complete tilting with a snap action, also operative yieldingly to hold the shell in either of its fully tilted positions and consisting of a spring formed of a single length of wire and embodying an elongated horizontally extending bottom part having the central portion thereof mounted pivotally in the notches in the second mentioned lug-like members, upwardly extending substantially semi-circular end parts having the lower ends thereof connected to the ends of the bottom part, and a pair of top parts connected to, and extending inwards from, the upper ends of the end parts and having the central portions thereof mounted pivotally in the notches in the first mentioned lug-like members.

5. A mounting structure for an anti-glare rear vision mirror of the type that embodies a horizontally elongated cup-shaped shell consisting of a rear wall and a continuous forwardly extending side wall and provided with a hole in the central portion of its rear wall, a mirror assembly shaped conformably to, and mounted fixedly within, the front portion of the shell side wall and embodying a pair of reflecting surfaces of different reflecting power and disposed at all times at a fixed small acute angle with respect to one another, and a mounting arm disposed for the most part behind the shell, provided at its rear end with attaching means and having its front end extending through said hole into the rear portion of the shell interior, said mounting structure comprising an upstanding pivot plate disposed in the shell between the central portions of the mirror assembly and the shell rear wall, having the central part thereof connected to the front end of the mounting arm, embodying between its top part and one of the walls of the shell a pivotal connection whereby the shell is permitted to tilt rearwards relatively to the pivot plate and mounting arm into a position wherein one of the reflecting surfaces of the mirror assembly is in the line of vision of the user and forwards relatively to said pivot plate and mounting arm into a position wherein the other reflecting surface is in the line of vision of the user, provided at its bottom part with a pair of forwardly extending laterally spaced lug-like members with downwardly facing notches therein, and also provided on its bottom part with a forwardly extending saddle-like member between the lug-like members, a bracket disposed in the shell interior beneath the pivot plate, mounted fixedly on the central portion of the bottom part of the shell side wall and provided with a pair of upwardly extending laterally spaced lug-like members with rearwardly facing notches therein, and a dead center spring arrangement operative after the shell is partially tilted into either position to complete tilting with a snap action, also operative yieldingly to hold the shell in either of its fully tilted positions and consisting of a spring formed of a single length of wire and embodying an elongated horizontally extending bottom part having the central portion thereof mounted pivotally in the notches in the second mentioned lug-like members, upwardly extending end parts having the lower ends thereof connected to the ends of the bottom part, and a pair of top parts connected to, and extending inwards from, the upper ends of the end parts and having the central portions thereof mounted pivotally in the notches in the first mentioned lug-like members, the mid part of said central portion of the bottom part of the spring being bent upwards and arranged so that it overlies said saddle shaped member and coacts therewith to hold the spring against lateral displacement and also limit rearward tilting movement of the shell.

6. A mounting structure for an anti-glare rear vision mirror of the type that embodies a horizontally elongated cup-shaped shell consisting of a rear wall and a continuous forwardly extending side wall and provided with a hole in the upper central portion of its rear wall, a mirror assembly shaped conformably to, and mounted fixedly within, the front portion of the shell side wall and embodying a pair of reflecting surfaces of different reflecting power and disposed at all times at a fixed small acute angle with respect to one another, and a mounting arm disposed for the most part behind the shell, provided at its rear end with attaching means and having its front end extending through said hole into the rear portion of the shell interior, said mounting structure comprising an upstanding I-shaped stamped metal pivot plate disposed in the shell between the central portions of the mirror assembly and the shell rear wall, having the central part thereof connected to the front end of the mounting arm by a universal joint, having the upper portion of its top part bent forwards to form a substantially horizontal flange, having the ends of its bottom part shaped and bent forwards to form a pair of lug-like members with downwardly facing notches therein, and provided on its bottom part with a forwardly extending saddle like member substantially midway between said lug-like members, means between the flange and the superjacent portion of the top part of the shell side wall forming a pivotal connection whereby the shell is permitted to tilt rearwards relatively to the pivot plate and mounting arm into a position wherein one of the reflecting surfaces of the mirror assembly is in the line of vision of the user and forwards relatively to said pivot plate and mounting arm into a position wherein the other reflecting surface is in the line of vision of the user, a bracket disposed in the shell interior beneath the pivot plate, mounted fixedly on the central portion of the bottom part of the shell side wall and provided with a pair of upwardly extending spaced lug-like members with rearwardly facing notches therein, and a dead-center spring arrangement operative after the shell is partially tilted into either position to complete tilting with a snap action, also operative yieldingly to hold the shell in either of its fully tilted positions and consisting of a spring formed of a single length of wire and embodying an elongated horizontally extending bottom part having the central portion thereof mounted pivotally in the notches in the second mentioned lug-like members, upwardly extending substantially semi-circular end parts having the lower ends thereof connected to the ends of the bottom part, and a pair of top parts connected to, and extending inwards from, the upper ends of the end parts and having the central portions thereof mounted pivotally in the notches in the first mentioned lug-like members, the mid part of said central portion of the bottom part of the spring being bent upwards and arranged so that it overlies said saddle shaped member and coacts therewith to hold the spring against lateral displacement and also limits rearward tilting movement of the shell.

References Cited in the file of this patent
UNITED STATES PATENTS

| | | |
|---|---|---|
| 2,356,432 | Roedding | Aug. 22, 1944 |
| 2,420,259 | McNamara | May 6, 1947 |
| 2,469,207 | Roedding | May 3, 1949 |
| 2,640,394 | Bertell | June 2, 1953 |
| 2,645,158 | Bertell | July 14, 1953 |